United States Patent
Kamal et al.

(10) Patent No.: US 10,650,632 B2
(45) Date of Patent: May 12, 2020

(54) SYSTEMS AND METHODS FOR PROVISIONING DIGITAL IDENTITIES TO AUTHENTICATE USERS

(71) Applicant: MASTERCARD INTERNATIONAL INCORPORATED, Purchase, NY (US)

(72) Inventors: Ashfaq Kamal, Stamford, CT (US); Sumeet Bhatt, Jericho, NY (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/853,643

(22) Filed: Dec. 22, 2017

(65) Prior Publication Data
US 2019/0197815 A1    Jun. 27, 2019

(51) Int. Cl.
| | |
|---|---|
| *G06K 5/00* | (2006.01) |
| *G07F 7/10* | (2006.01) |
| *G07C 9/00* | (2020.01) |
| *H04L 29/06* | (2006.01) |
| *H04L 9/32* | (2006.01) |
| *H04L 9/08* | (2006.01) |

(Continued)

(52) U.S. Cl.
CPC ....... *G07F 7/1008* (2013.01); *G06K 9/00013* (2013.01); *G06K 9/00255* (2013.01); *G06Q 20/105* (2013.01); *G06Q 20/3223* (2013.01); *G06Q 20/341* (2013.01); *G07C 9/00087* (2013.01); *H04L 9/0861* (2013.01); *H04L 9/3247* (2013.01); *H04L 63/0823* (2013.01); *H04L 63/0861* (2013.01); *H04W 4/80* (2018.02); *G07C 2009/00095* (2013.01); *H04W 12/06* (2013.01)

(58) Field of Classification Search
CPC ...... G06Q 20/20; G06Q 20/206; G06Q 20/40; G06K 19/00
USPC ......................................... 235/380, 382, 385
See application file for complete search history.

(56) References Cited

U.S. PATENT DOCUMENTS 6,325,285 B1 * 12/2001 Baratelli .............. G06K 7/0021
235/380
6,819,219 B1   11/2004 Bolle et al.
(Continued)

*Primary Examiner* — Daniel St Cyr
(74) *Attorney, Agent, or Firm* — Harness, Dickey & Pierce, P.L.C.

(57) ABSTRACT

Systems and methods are provided for use in providing digital identities for users. One exemplary method includes receiving, at a card device, an authentication request and a captured first biometric of the user, from a communication device associated with the user, and comparing the first biometric and a first biometric reference at the card device, when the first biometric reference is stored in at the card device. The method also includes capturing, at the card device, a second biometric of the user and comparing the second biometric to a second biometric reference stored at the card device. The method further includes compiling a response to the authentication request including a first indicator associated with the comparison of the first biometric to the first biometric reference and a second indicator associated with the comparison of the second biometric to the second biometric reference, and transmitting the response to the communication device.

16 Claims, 3 Drawing Sheets

(51) Int. Cl.
*G06K 9/00* (2006.01)
*G06Q 20/32* (2012.01)
*G06Q 20/34* (2012.01)
*G06Q 20/10* (2012.01)
*H04W 4/80* (2018.01)
*H04W 12/06* (2009.01)

(56) References Cited

U.S. PATENT DOCUMENTS

| | | | |
|---|---|---|---|
| 7,634,448 | B1 | 12/2009 | Ramachandran |
| 10,142,333 | B1 | 11/2018 | Griffin et al. |
| 2002/0046336 | A1 | 4/2002 | Kon et al. |
| 2004/0044627 | A1 | 3/2004 | Russell et al. |
| 2007/0220273 | A1* | 9/2007 | Campisi ............. G06K 9/00006 713/186 |
| 2008/0028230 | A1* | 1/2008 | Shatford ............... H04L 9/3231 713/186 |
| 2009/0190802 | A1 | 7/2009 | Adams et al. |
| 2009/0322477 | A1* | 12/2009 | Celorio .............. G07C 9/00087 340/5.82 |
| 2012/0254030 | A1 | 10/2012 | Khan et al. |
| 2012/0311719 | A1* | 12/2012 | Hamann ................ G06F 21/32 726/27 |
| 2012/0313754 | A1 | 12/2012 | Bona |
| 2013/0232082 | A1 | 9/2013 | Krawczewicz et al. |
| 2013/0318361 | A1 | 11/2013 | Erickson et al. |
| 2014/0317715 | A1 | 10/2014 | Conner et al. |
| 2014/0359722 | A1* | 12/2014 | Schultz ............... H04L 63/0861 726/5 |
| 2015/0127553 | A1 | 5/2015 | Sundaram et al. |
| 2015/0149782 | A1 | 5/2015 | Thom et al. |
| 2015/0269563 | A1 | 9/2015 | He et al. |
| 2016/0300236 | A1 | 10/2016 | Wiley et al. |
| 2016/0381003 | A1* | 12/2016 | Caceres ............. H04L 63/0823 713/156 |
| 2017/0116614 | A1 | 4/2017 | Tanaka |
| 2018/0101718 | A1* | 4/2018 | Lowe ..................... G06F 21/32 |
| 2018/0174149 | A1 | 6/2018 | Goldschmidt |
| 2018/0181739 | A1* | 6/2018 | Zhong ................. G06F 21/62 |
| 2018/0189583 | A1* | 7/2018 | Wohlken ........... G06K 9/00926 |
| 2019/0199714 | A1 | 6/2019 | Kamal et al. |

* cited by examiner

SYSTEMS AND METHODS FOR PROVISIONING DIGITAL IDENTITIES TO AUTHENTICATE USERS

FIELD

The present disclosure generally relates to systems and methods for provisioning digital identities to authenticate users and, in particular, to systems and methods for use in compiling such digital identities, based on contactless communication with devices associated with the users, whereby the digital identities are then provisioned to the communication devices (or other devices) and useable to authenticate the users.

BACKGROUND

This section provides background information related to the present disclosure which is not necessarily prior art.

People are known to be associated with a variety of different types of accounts, including email accounts, bank accounts, and payment accounts, to name a few. In connection with opening the accounts, people to be associated with the accounts (broadly, users) may initially need to be identified and verified. For example, when a person opens a banking account with a banking institution, the banking institution typically requires the person to present identification, often in the form of a driver's license or other government issued document, prior to permitting the person to open the account. Such identification process, or "know your customer" (KYC) process, is provided to inhibit the person from fraudulently opening the account, based on, for example, identity theft or otherwise. More broadly, the identification process aids the banking institution in abiding by applicable rules and/or regulations regarding accounts issued thereby (e.g., relating to anti-money laundering, anti-corruption, etc.).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
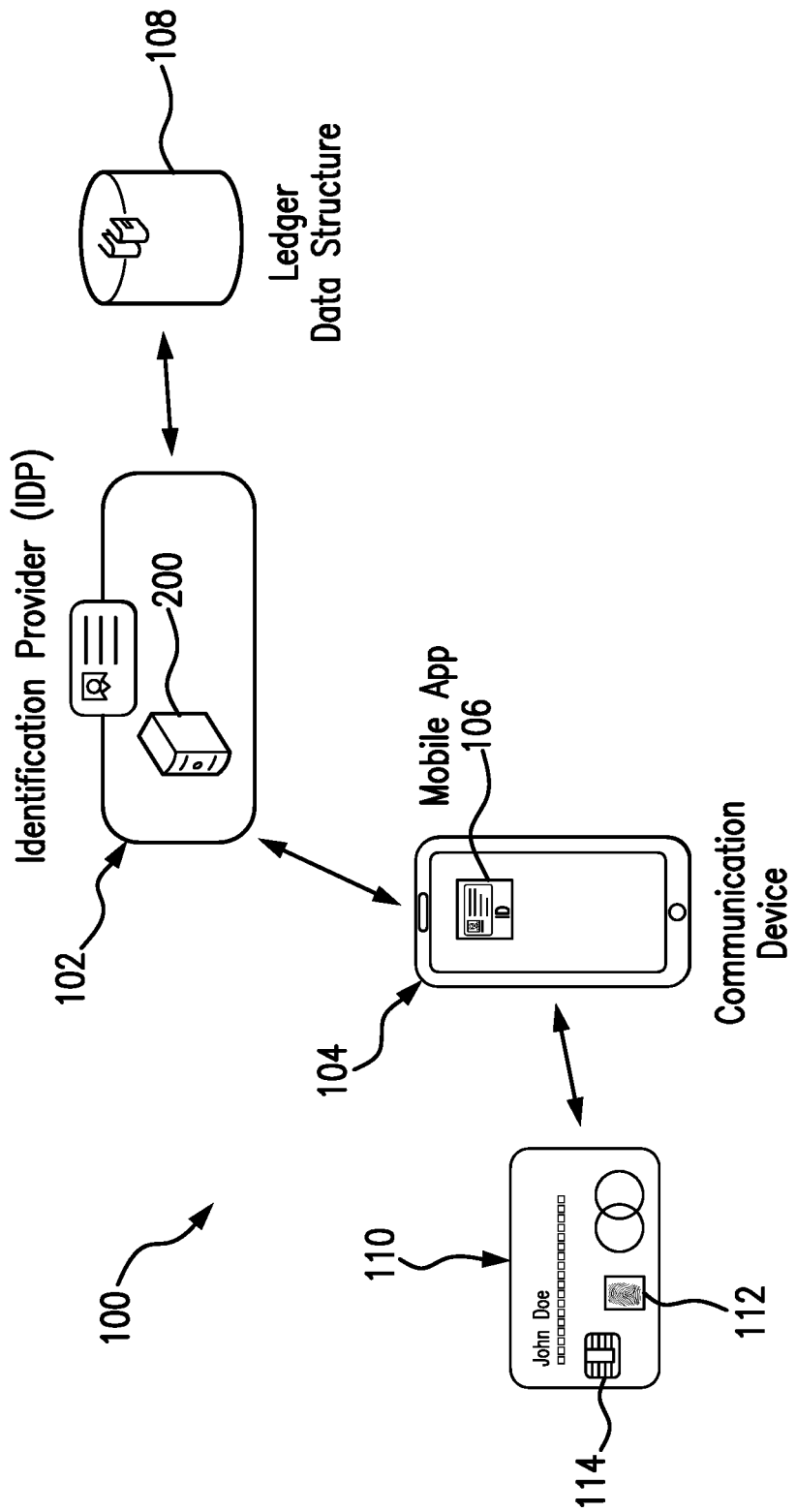
FIG. 1 illustrates an exemplary system of the present disclosure suitable for use in provisioning a digital identity for a user, for subsequent use in authenticating the user.

Exemplary embodiments will now be described more fully with reference to the accompanying drawings. The description and specific examples included herein are intended for purposes of illustration only and are not intended to limit the scope of the present disclosure.

Many users apply for accounts, such as, for example, banking accounts, investment accounts, payment accounts, etc., where the users are required to provide proof of identity in connection with application for such accounts, whereby the users may be authenticated. In connection therewith, the users may present one or more physical identification documents, in person or through electronic means (e.g., via facsimile, email, etc.), to issuers of the accounts, or the users may present digital identities to the account issuers. Regardless of form, but subject to their interactions with the users, the account issuers are then able to verify and authenticate the users. Uniquely, the systems and methods herein permit provisioning of digital identities for users, based on, at least in part, interactions between communication devices associated with the users and contactless card devices (including payment devices, payment cards, other card devices, etc.). In particular, when a user requests a digital identity to be provisioned to his/her communication device, as provided herein, a mobile application is initially installed therein (the mobile application may be certified and/or signed by an identification provider, etc., for security and/or to operate as provided herein, etc.). In turn, an authentication request is provided from the identification provider, through the mobile application, and to a contactless card device associated with the user. Further, a reference biometric for the user is provided, in addition to the authentication request, to the contactless card device. The contactless card device in turn captures the biometric from the user, and compares the biometric to the reference biometric therein (if present). A response is compiled for the biometric comparison, at the contactless card device (and, potentially, signed and/or encrypted), and transmitted to the communication device and then provided to the identification provider, via the communication device. When the response indicates that the biometrics match, the identification provider associated with the mobile application is able to provision a digital identity for the user to the communication device. However, if the response transmitted to the communication device indicates that the biometrics do not match (e.g., because a corresponding reference biometric is not stored in the contactless card device, etc.), the communication device may instead capture and compare/verify a physical document indicative of the user's identity, whereby, again, when the physical document is verified (e.g., based on comparison to a corresponding reference document and/or corresponding reference information, etc.), it is provided to the identity provider so that the identification provider is able to provision a digital identity for the user to the communication device.

In this manner, through the systems and methods herein, efficient provisioning of digital identities to users is provided, and protected by a two-factor authentication of the user. What's more, the digital identities are not necessarily tied to any specific communication device used by the users, whereby the interactions relied upon to provision the digital identities may be performed by the users in multiple different communication devices to further provision the digital identity to those devices.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, relationships between users and identification providers, particular types of devices employed in the identification process (e.g., particular types of communication devices, particular types of contactless devices, etc.), privacy requirements, etc.

The system 100 generally includes an identification provider (IDP) 102 and a communication device 104 including a mobile application 106, each of which is coupled to (and is in communication with) one or more networks. The network(s), as indicated generally by arrowed lines in FIG. 1, may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. The communication device 104 may include, for example, a smartphone, a tablet, a laptop computing device, etc., which is generally a portable communication device.

The IDP 102 is configured to interact with the mobile application 106 included in the communication device 104. The IDP 102 may be a standalone service and/or entity. Additionally, or alternatively, the IDP 102 may be incorporated, in whole or in part, with another entity in the system 100, such as, for example, a payment network or a banking institution, etc. Specifically, for example, the IDP 102 may be incorporated into the MasterCard® payment network. As shown, the IDP 102 includes a computing device 200, which is shown in detail in FIG. 2 (and is described in more detail hereinafter). In addition, the IDP 102 is associated with a ledger data structure 108, which is configured to communicate with the IDP 102 (and/or a requestor associated therewith, etc.), either directly or through one or more networks. The ledger data structure 108 is configured to store digital identities, and corresponding certification records (together or separately). In this exemplary embodiment, the ledger data structure 108 includes a block chain data structure, whereby the ledger data structure 108 includes a continually growing list of ordered records (where each record includes a time stamp and a reference or link to a prior record). That said, it should be understood that other, equivalent or not, data structures may be employed in other embodiments for use in the ledger data structure 108 and/or for use with the IDP 102, etc.

The communication device 104 in the system 100 is associated with a user (not shown) (e.g., a personal device of the user, not a publically available and/or shared device, etc.), who is associated with an identity. In general, the identity indicates and/or includes (without limitation) one or more of a name of the user, an address of the user, a birthdate for the user, contract information for the user, a social security number or other government identification number for the user, etc. The user's identity may be evidenced by a number of physical documents and/or devices, all of which may be used alone, or in combination, as described herein. For example, such physical documents may include a passport, a driver's license issued by a state, regional, or federal government (or other government issued ID); a government identification card, a social security card; a health insurance card; a bank statement; an employee ID; a library card; a utility bill; etc. Further, the user is associated with a payment device 110, which, in this exemplary embodiment, includes a payment card. Specifically, the payment device 110 includes a contactless payment device, which is associated with a payment account issued to the user by an issuer (not shown) and which is also associated with a payment network (e.g., a payment network including the IDP 102, etc.). It should be appreciated that any of the above types of physical documents/devices may be used in place of the payment device 110 and may include, or be adapted to include, a manner of a contactless or wireless communication as described, such that the device 110 is not limited to being a payment device (e.g., a contactless social security card and/or driver's license consistent with the device 110, etc.). Generally, therefore, the payment device 110 is more broadly referred to as a card device.

In this exemplary embodiment, the payment device 110 associated with the user includes the payment card and, more specifically, a contactless card device, whereby it is configured to communicate with a point-of-sale (POS) terminal or other device (e.g., the communication device 104, etc.) without having to make specific contact in order to communicate (e.g., without having to swipe a magnetic strip, or generally without inserting the payment device 110 into a reader, etc.). In this manner, the payment device 110 may be used to initiate a transaction at a merchants (associated with the POS terminal), where the transaction is to be funded by the payment account associated with the payment device 110. The particular contactless communication, in this embodiment, includes near field communication (NFC), but may include other types of contactless or wireless communication in other embodiments.

In addition, in this exemplary embodiment, the payment device 110 includes a biometric functionality. In particular, and as shown in FIG. 1, the payment device 110 includes a biometric reader 112, which is used, in this example, to capture a fingerprint for the user. What's more, the payment device 110 includes a memory (e.g., memory 204 of FIG. 2, etc.), in which one or more reference biometrics may be stored for comparison to the biometric captured at the biometric reader 112, or otherwise (e.g., as part of a chip 114 (e.g., an EMV chip, etc.) associated with the payment device 110 and in communication with the biometric reader 112, etc.). In other embodiments, however, the biometric reader 112 may be omitted from the payment device 110, whereby the biometric is captured from the user otherwise (e.g., via a camera of the user's communication device 104, via a scanner of a POS terminal, etc.), and then compared (by the payment device 110 or by the device used to capture the biometric or by still another device) to the reference biometric included in the payment device 110 (where the reference biometric may be transferred from the payment device 110 to the other device for such comparison). While the biometric reader 112 is disclosed as being configured to capture a fingerprint, it should be appreciated that the biometric reader 112 (or other biometric readers associated with the payment device 110, either directly or indirectly) may be configured to capture other biometrics of the user in other exemplary embodiments, including, for example, a facial image, a palm print, a heartbeat, a retina scan, etc., and used as a biometric consistent with the disclosure herein.

Further in the illustrated system 100, within the communication device 104, the mobile application 106 may include one or more additional applications downloaded to, installed, and/or active in the communication device 104. In addition, the mobile application 106 is associated with the IDP 102, in that the IDP 102 has certified and/or signed the mobile application 106. The certification and/or signature may be provided in a number of manners, including, for example, by use of a software development kit (SDK) made available from the IDP 102, or by inclusion based on a review by the IDP 102 (e.g., provisioned by the IDP 102, etc.), etc. By the certification and/or signature, the mobile application 106 may be verified by the IDP 102, and vice-versa, as described in more detail below.

Figure 2:
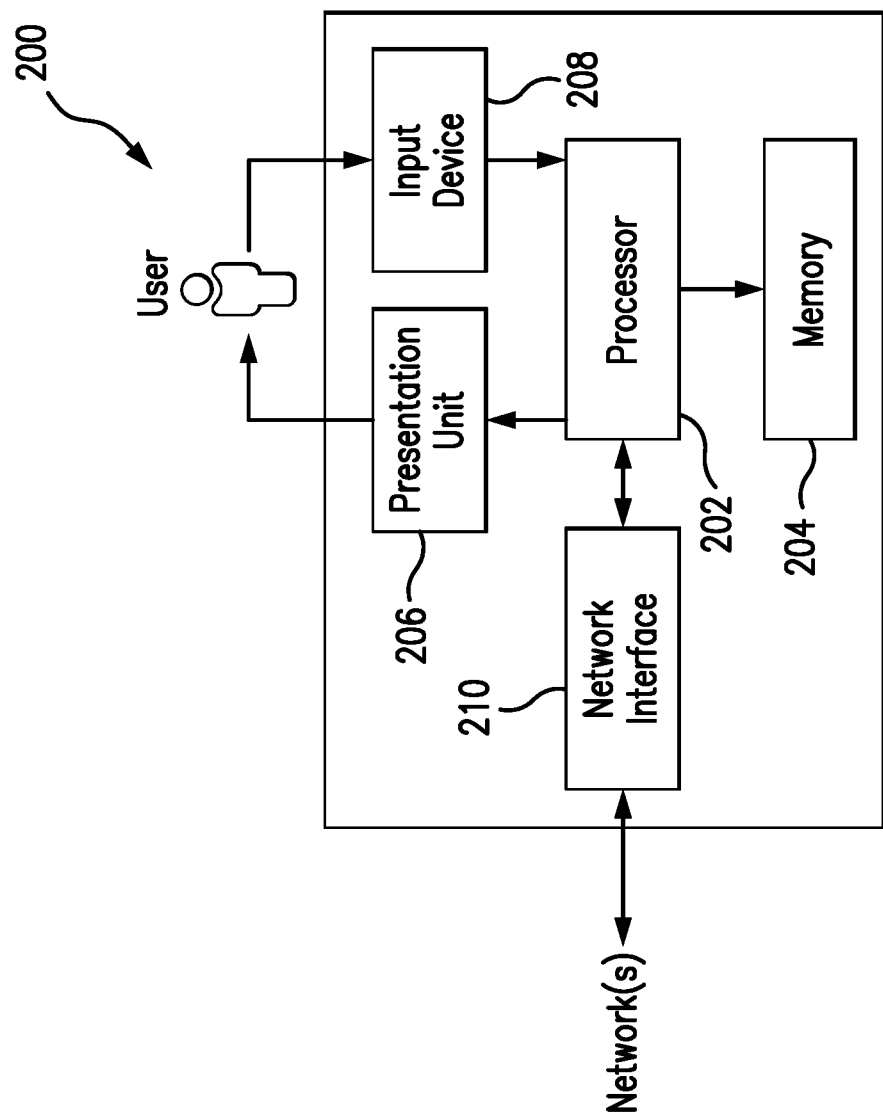
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, and as described above, the IDP 102 is illustrated as including, or being implemented in, computing device 200, coupled to (and in communication with) one or more networks. In addition, the communication device 104 and the payment device 110 associated with a user can also be considered computing devices (or as including computing devices) generally consistent with computing device 200 for purposes of the description herein. The ledger data structure 108 also may be understood to be a computing device generally consistent with the computing device 200. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein. In one example, the processor 202 may include an EMV chip.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, biometrics (e.g., facial images (e.g., selfies, etc.), fingerprints, etc.), biometric references, images, private and/or public keys, public/private key pairs, identity records, digital identities, certificates, ID data, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the operations or processes described herein.

In the exemplary embodiment, the computing device 200 also includes a presentation unit 206 that is coupled to (and in communication with) the processor 202 (however, it should be appreciated that the computing device 200 could include output devices other than the presentation unit 206, etc.). The presentation unit 206 outputs information (e.g., prompts to provide biometrics, indication of successful provisioning of a digital identity, prompts to scan a physical document, etc.), visually or audibly, for example, to a user of the computing device 200 (e.g., a user associated with the communication device 104, etc.), etc. And, various interfaces (e.g., as defined by the mobile application 106, or as defined by one or more websites, etc.) (e.g., including instructions to capture biometrics, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs) of the computing device 200 such as, for example, images of physical documents, images of the user (e.g., facial images, etc.), and/or biometrics for the user, etc., in response to prompts from the mobile application 106, as further described below. The input device 208 may include a single input device or multiple input devices. The input device 208 is coupled to (and in communication with) the processor 202 and may include, for example, one or more of a keyboard, a pointing device, a mouse, a stylus, a camera, a biometric reader (e.g., fingerprint scanner, etc.), a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a radio-frequency (RF) adapter (e.g., a radio-frequency identification (RFID) adapter, etc.), a Bluetooth™ adapter, etc.) (e.g., suitable for "contactless communication," etc.), a mobile network adapter, or other device capable of communicating to one or more different ones of the networks herein and/or with other devices described herein. Further, in some exemplary embodiments, the computing device 200 may include at least one processor (e.g., the processor 202, etc.), at least one memory (e.g., the memory 204, etc.), and/or one or more network interfaces (e.g., network interface 210, etc.) included in, or incorporated into or with the at least one processor (e.g., as an embedded card chip (e.g., having an antenna, etc.), etc.). An example of such a computing device includes chip 114 of the payment device 110.

Referring again to FIG. 1, when the user desires to provision a digital identity from the IDP 102 to the communication device 104, the user initially accesses the mobile application 106, at the communication device 104. In turn, the communication device 104, as configured by the mobile application 106, communicates with the IDP 102. In connection with that communication, the IDP 102 is configured to cooperate with the communication device 104 to initially verify the installation of the mobile application 106 and that the mobile application 106 is signed and/or certified by the IDP 102 (or an associated entity (e.g., a payment network, etc.)). Once verified, the communication device 104, again as configured by the mobile application 106, generates a PKI (public key infrastructure) key pair, which includes a public key and a private key, and then transmits the public key from the PKI key pair along with a device ID for the communication device 104 to the IDP 102. The device ID may include, for example, an application ID (or app ID) for the mobile application 106 or other application, a media access control (MAC) address for the communication device 104, a universal unique identifier (UUID), an international mobile equipment identity (IMEI), a digital serial number (DSN), or other suitable identifier, etc.

In response to receipt of the public key and the device ID from the communication device 104, the IDP 102 is configured to determine if the communication device 104 is already provisioned with a digital identity for the user based on, at least in part, the device ID or other data received from the mobile application 106. If it is already provisioned with such a digital identity, the IDP 102 is configured to return a message to the communication device 104 and/or mobile application 106 indicating the same, whereby no further actions to provision another digital identity to the communication device 104 will occur.

However, if a digital identity is not already provisioned to the communication device 104, the IDP 102 is configured to compile an authentication request message, to sign the authentication request with a private key of the IDP 102, and to transmit the authentication request to the communication device 104. In response, the communication device 104, as configured by the mobile application 106, verifies the authentication request, including by verifying the private key received from the IDP 102 using its public key from the PKI key pair generated above. It should be appreciated that, apart from the PKI key pair in the communication device 104, which is generated as described herein, public-private key pairs are generally included in the IDP 102 and/or the payment device 110 for use as described herein. Alternately, the keys may be disseminated through a runtime key exchange mechanism (e.g., through an Elliptic-Curve Diffie-Hellman (ECDH) key agreement, which may allow the IDP 102 and the communication device 104, each having an elliptic-curve public-private key pair, to establish a shared secret over an insecure channel; etc.).

In the meantime, or prior, or subsequently, the communication device 104, as configured by the mobile application 106, via the wireless network adaptor (broadly, the network interface 210), polls the vicinity for any NFC-enabled devices, intermittently, or at one or more intervals. For example, the communication device 104, as configured by the mobile application 106, via the wireless network adaptor, may poll for NFC devices for 10-60 seconds (or some other interval) after transmitting the public key and device ID to the IDP 102. When the payment device 110 is proximate to the communication device 104 (i.e., close enough for an NFC connection), the communication device 104, as configured by the mobile application 106, detects the payment device 110, provides its certificate to the payment device 110, and then attempts to authenticate the payment device 110 based on a certificate received from the payment device 110. Conversely, the payment device 110 may be configured to provide its certificate to the mobile application 106 included in the communication device 104, and to attempt to authenticate the mobile application 106 based on the certificate received from the communication device 104 and/or the mobile application 106. In connection therewith, such authentication may include validating a signature of the received certificate (e.g., which may include an X.509 formatted certificate, etc.) based on information already included in the communication device 104 and the payment device 110 and/or information included in the received certificate (e.g., certificate(s), key(s), etc.), or information received through a network connection, or otherwise (e.g., thereby facilitating a mutual "handshake", etc.). For example, the public key included in the received certificate may be extracted by the receiving entity (e.g., the communication device 104, the payment device 110, etc.) and used to verify the signature of the certificate. (based on information already included in the communication device 104 and the payment device 110 and/or information included in the received certificate (e.g., certificate(s), key(s), etc.), or information received through a network connection, or otherwise) (e.g., thereby facilitating a mutual "handshake", etc.). For example, the public key included in the received certificate may be extracted by the receiving entity (e.g., the communication device 104, the payment device 110, etc.) and used to verify the signature of the certificate.

Once the communication device 104 and the payment device 110 are mutually authenticated, and also in response to the authentication request message from the IDP 102, the communication device 104, as configured by the mobile application 106, prompts the user to capture an image biometric of the user (e.g., a facial image, etc.) (e.g., via a camera input device 208 of the communication device 104, etc.). The communication device 104 is configured to, then, capture the image of the user in response to one or more user inputs, and to pass the captured image and the authentication request message (received from the IDP 102) to the payment device 110, over the NFC connection.

In response to the communication from the communication device 104, the payment device 110 is configured to verify that the signature included in the authentication request is from the IDP 102 (e.g., based on a public key held by the payment device 110, etc.). In addition, the payment device 110 is configured to, directly or via the communication device 104, prompt the user to provide a biometric to the biometric reader 112 on the payment device 110. When the biometric is presented, the payment device 110 is configured to capture the biometric (e.g., a fingerprint, etc.) and to compare the captured biometric to a reference biometric in the payment device 110. When there is a match (e.g., a substantial match within a defined threshold, etc.) between the captured biometric and the reference biometric (and also between the captured image and a reference image (when previously stored)), the payment device 110 is configured to store the image of the user in memory (e.g., the memory 204, etc.), and to compile, sign using the generated private key, and encrypt under the public key a response to the authentication request from the IDP 102. The response includes, among other things, an indication of the match between the captured biometrics and the reference biometrics (including between the captured image biometric of the user and a reference image). The payment device 110 is configured to then transmit the signed, encrypted response to the IDP 102, via the mobile application 106 and the communication device 104.

In this exemplary embodiment, the IDP 102 is configured to check the response from the payment device 110, by use of the public key of the payment device 110 to verify that it is, in fact, a response from the payment device 110.

Thereafter, the communication device 104, as configured by the mobile application 106, determines if an image biometric match was performed and, if not, prompts the user to scan a physical document indicative of the user's identity. That is, when the user's image was previously stored as a reference in the payment device 110, and a comparison was performed based on that reference biometric image, additional image verification of the user (e.g., via the physical document, etc.) may be omitted. However, when matching of the image biometric failed or did not occur because there was no biometric image reference included in the payment device 110, for example, the communication device 104, as configured by the mobile application 106, prompts the user to capture an image of and/or associated with a physical document, and then, based on one or more user inputs, captures an image of the physical document presented to the communication device 104. Thereafter, the communication device 104, as configured by the mobile application 106, compares the captured image of the user to the captured image of the physical documents, and specifically, an image of the user included in the physical document, using conventional methods. When there is a match (e.g., a substantial match within one or more defined, conventional thresholds, etc.), the communication device 104, as configured by the mobile application 106, directs the payment device 110 to store the image biometric reference in its memory. Also, when there is a match, the communication device 104, as configured by the mobile application 106, compiles and then signs the ID data (e.g., image of the physical document or name of the user, address, birthdate (determined from the image of the physical document, for example), etc.) and the biometric (e.g., a facial image, etc.) with the private key of the mobile application 106. The communication device 104, as configured by the mobile application 106, then encrypts the data with the public key from the IDP 102, and transmits the signed, encrypted data to the IDP 102.

In turn, the IDP 102 is configured to verify the signed, encrypted data received from the communication device 104. To do so, the IDP 102 is configured to decrypt the data and to verify the signature on the data using its private key. Then, the IDP 102 is configured to issue a digital identity for the user to the communication device 104, whereby the user, via the communication device 104, may present the digital identity to one or more entities in connection with verifying and/or authenticating the identity of the user.

Subsequently, from time to time, the user may acquire a new or different communication device (i.e., an added communication device), in addition to or in place of the communication device 104. For example, the communication device 104 may be lost, stolen, damaged, or otherwise unavailable to the user, or simply not the primary device of the user, whereby the user may attempt to provision the digital identity to the added communication device. In this situation, the mobile application 106 is installed and activated in the added communication device. Thereafter, the added communication device, as configured by the mobile application 106, interactions with the IDP 102 and/or the payment device 110 in the manner described above. However, because the digital identity is already compiled and stored at the IDP 102, the added communication device, as configured by the mobile application 106, will optionally be able to forgo the capture of the physical document and/or ID data. As such, the IDP 102 is configured to provision the digital identity to the added communication device when the user biometric is matched and a signed message (e.g., a signed, encrypted message, etc.) indicates that the match has been received at the IDP 102 (pursuant to the operations above) and verified.

Figure 3:
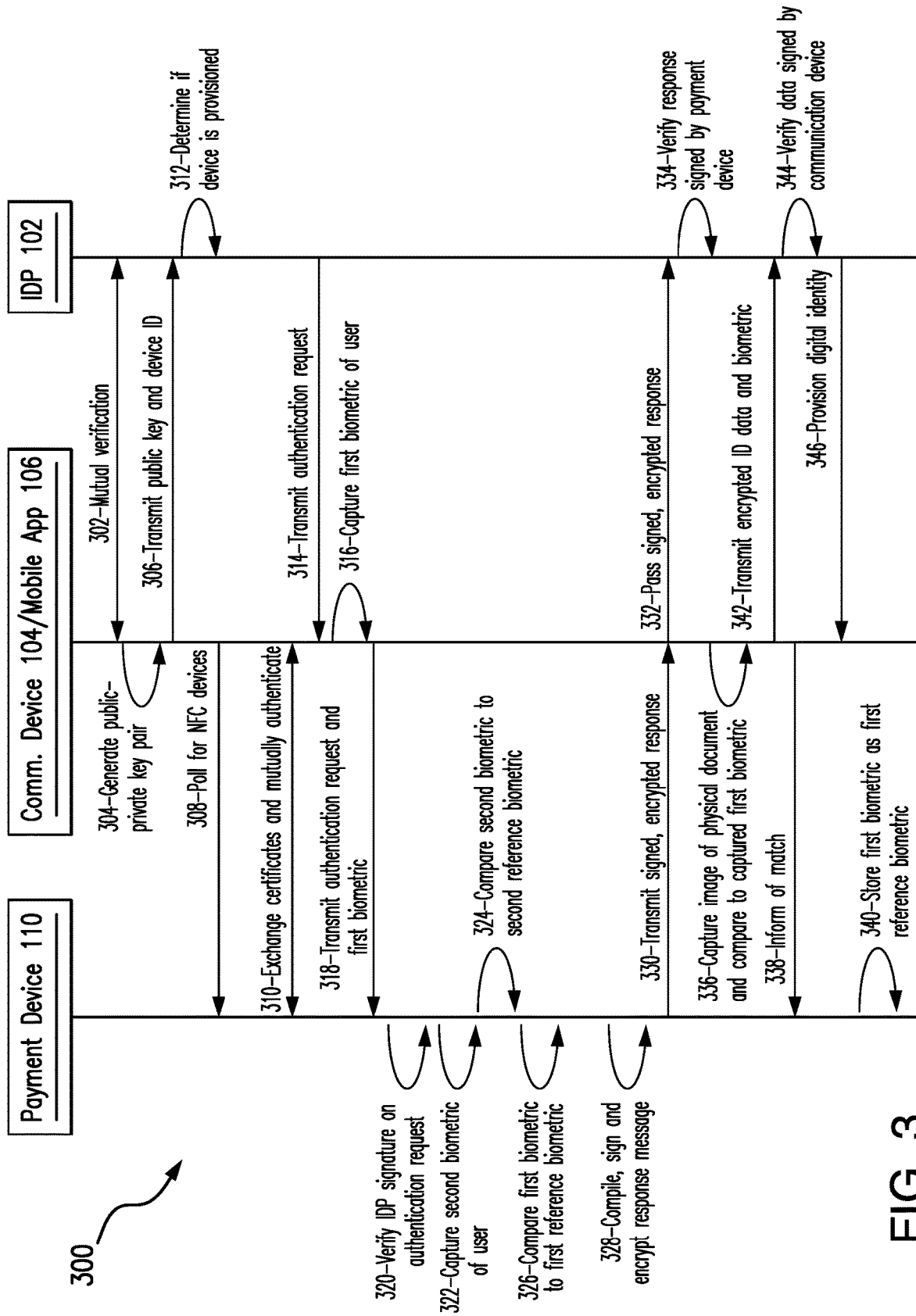
FIG. 3 includes a flow diagram of an exemplary method, which may be implemented in connection with the system of FIG. 1 for provisioning a digital identity for a user at a first device associated with the user.

FIG. 3 illustrates an exemplary method 300 for use in compiling and storing a digital identity record. The exemplary method 300 is described as implemented in the IDP 102, the communication device 104, and the payment device 110 of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, the user desires to provision a digital identity to the communication device 104, based on his/her payment device 110, for use in subsequently verifying his/her identity with, for example, a banking institution in connection with opening a new account. To do so, the user downloads and installs the mobile application 106 to the communication device 104. Then, to initiate the exemplary method 300, the user launches the mobile application 106 and/or requests to provision a digital identity through the mobile application 106. In turn, the communication device 104 communicates with the IDP 102, whereupon the mobile application 106 and the IDP 102 mutually verify one another, at 302. This may include, for example, verifying installation of the mobile application 106 at the communication device 104, verifying the mobile application 106 is a signed and/or certified application, etc. What's more, the communication device 104 may execute an integrity and/or setting check, as defined by the mobile application 106, to verify the communication device 104, and provide a result of the integrity and/or setting check of the communication device 104 to the IDP 102, which then validates the check prior to proceeding. For example, the IDP 102 may limit provisioning of digital identities to communication devices of a certain security and/or operating system (OS) version, etc.

Thereafter, the communication device 104 and/or the mobile application 106 generates, at 304, a public-private key pair, and then transmits, at 306, the public key along with a device ID for the communication device 104 and/or the mobile application 106 to the IDP 102.

In addition, after installation of the mobile application 106, or in connection therewith, or once the public key and device ID are transmitted, the communication device 104 polls, at 308, for NFC devices proximate to the communication device 104. Specifically, the communication device 104 initiates a polling for a defined interval after transmitting the public key and device ID. The defined interval may include, for example, 10 seconds, 20 seconds, 60 second, 3 minutes, or some other suitable interval. In that time, as the user has requested to provision a digital identity to the communication device 104, based on the payment device 110, the user intentionally moves the payment device 110 into close proximity of the communication device 104, whereby the polling results in detection of the payment device 110 and forming of an NFC connection between the communication device 104 and the payment device 110. It should be appreciated that the polling, by the communication device 104, may be initiated in another manner. For example, the communication device 104 and/or the mobile application 106 may instruct the user to move the communication device 104 close to the payment device and then to select a button presented to the user at the presentation unit 206 of the communication device 104, whereby the communication device 104 and/or the mobile application 106 polls for the NFC device or other type of contactless device.

Once the communication device 104 and the payment device 110 are in communication, the payment device 110 and the communication device 104 exchange certificates and mutually authenticate one another, at 310. Specifically, for example, the communication device 104 receives the public key of the payment device 110, while the payment device 110 receives the public key of the communication device 104 in the exchange. Using these public keys and certificates that binds the public key, both the payment device and the communication device can mutually authenticate each other.

Meanwhile in the method 300, in response to receiving the public key and the device ID from the communication device 104 (and/or mobile application 106), the IDP 102 determines, at 312, whether the communication device 104 has been provisioned, or not, with a digital identity. If the communication device 104 has already been provisioned with a digital identity, the method 300 ends, potentially, with a message returned to the communication device 104 providing notification of the previous provisioning.

Conversely, if such a digital identity has not yet been provisioned to the communication device 104, the IDP 102 transmits an authentication request, at 314, to the communication device 104. The authentication request, in this example, is signed by the IDP 102 using the private key of the IDP 102. Upon receipt of the authentication request, the communication device 104 prompts the user to capture a first biometric. In this example, the first biometric includes a facial image of the user. Upon an input from the user (e.g., via input device 208, etc.), the communication device 104 captures, at 316, the first biometric of the user. The communication device 104 then transmits the captured first biometric (e.g., the facial image of the user, etc.), along with the authentication request, at 318, to the payment device 110, via the NFC connection therebetween.

In turn, the payment device 110 verifies, at 320, the signature of the IDP 102 on the authentication request, for example, based on the public key held by the payment device 110.

The payment device 110 then prompts the user to provide a second biometric to the biometric reader 112 of the payment device 110, either directly, through a presentation unit 206 of the payment device 110, or indirectly through the communication device 104 (or other device). Thereafter, the user applies his/her thumbprint or fingerprint (or other biometric) to the biometric reader 112, and the payment device 110 captures, at 322, the second biometric of the user. Thereafter, the payment device 110 compares, at 324, the captured second biometric to a biometric reference in memory of the payment device 110 (e.g., the memory 204, etc.) to determine if there is a match. At that time, or before, or after, the payment device 110 also compares, at 326, the received first biometric (e.g., the facial image in this example, etc., as received from the communication device 104 and/or mobile application 106 (at 318)) to another biometric reference in memory of the payment device 110 (if the another biometric reference is available). Notably, if no biometric reference(s) is/are included in the memory of the payment device 110, no comparison is able to be done.

Next in the method 300, the payment device 110 compiles a response to the authentication request, signs the response, and then encrypts the response, at 328. The response includes an indicator of the result of the matching of the first biometric match (if any) and an indicator of the result of the matching of the second biometric. The response is signed with the private key of the payment device 110 and encrypted with the public key of the IDP 102 (as received in the authentication request). The signed, encrypted response is then transmitted, by the payment device 110, at 330, to the communication device 104, which then passes, at 332, the response to the IDP 102.

Upon receipt of the response to the authentication request, from the communication device 104, the IDP 102 verifies, at 334, that the response is signed by the payment device 110. In general, this is performed based on the private key held by the IDP 102.

Separately in the method 300, when the communication device 104 receives the response to the authentication request from the payment device 110, the communication device 104 determines if the first biometric match (and associated comparison) was performed at the payment device 110, or not (e.g., due to a first biometric reference being not present at the payment device 110, etc.). When the first biometric match/comparison was performed, the payment device 110 may transmit a token to the communication device 104 representative of the match (e.g., confirming that the first biometric match was performed, confirming the match, providing details of the match, etc.). And, the communication device 104 then waits for the IDP 102 to proceed (at 344, as described below). However, if the first biometric match/comparison is not performed at the payment device 110 (e.g., when a reference biometric is not present at the payment device 110, such that a comparison of the captured first biometric to a reference biometric is not performed or possible; etc.) (e.g., the communication device 104 does not receive a token representative of the match, etc.), the communication device 104 prompts the user to present a physical document evident of the user's identity to the communication device 104, whereby the communication device 104 captures an image of the physical document and compares the image associated with the physical document to the captured first biometric image, at 336. Then, when the images match, the communication device 104 informs, at 338, the payment device 110, thereby permitting the payment device 110 to store, at 340, the first biometric as a reference biometric in the payment device 110 (e.g., when such a reference biometric is not already stored in the payment device 110, etc.). In this manner, the payment device 110 will include a reference biometric for one or more subsequent authentication requests from the IDP 102. The communication device 104 then transmits, at 342, the ID data and the biometric data to the IDP 102, where the data is signed by the private key of the communication device 104 and encrypted using the public key of the IDP 102.

Here, in response to receiving the signed and encrypted data from the communication device 104 (transmitted at 340), and based on the verification performed by the IDP 102, at 334, the IDP 102 further verifies, at 344, that the data is signed by the communication device 104 (e.g., by use of the private key of the IDP 102, etc.). The IDP 102 then provisions, at 346, a digital identity for the user to the communication device 104 for use is verifying the user's identity.

Subsequently, the user may desire to provision a digital identity to an added communication device, which may replace the communication device 104, or which may be used in addition to the communication device 104. In this situation, the user, as described above, downloads and installs the mobile application 106 to the added communication device, whereupon the method 300 is initiated and/or repeated. The method 300 progresses as described above, except that when the added communication device when the first biometric is compared at the payment device 110, a biometric reference is stored therein to enable the comparison. As such, the added communication device and/or the mobile application 106 will not prompt the user for an image of a physical document, or capture an image of the physical document for comparison of the first biometric. Rather, the added communication device will simply pass the verification of the biometrics to the IDP 102. Thereafter, upon verification of the message from the added communication device, the IDP 102 provisions, at 346, the digital identity to the added communication device. In this manner, the new communication device is able to be provisioned, with the digital identity, without the presentation of one or more physical documents (as this was previously done).

In view of the above, the systems and methods herein provide for digital identity verification. As part thereof, the user is able to leverage a contactless device, such as a NFC enabled card, to provide two-factor authentication in connection with provisioning a digital identity to a communication device associated with the user. In this manner, the digital identity is efficiently provisioned to the communication device, often without the presentation of a physical document evidencing the identity of the user.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a card device, an authentication request and a captured first biometric of the user, from a communication device associated with the user, the card device including a wireless network interface and a memory, the authentication request associated with an identity provider; (b) comparing, by the card device, the first biometric and a first biometric reference when the first biometric reference is stored in said memory of the card device; (c) capturing, at the card device, a second biometric of the user, the second biometric different than the first biometric; (d) comparing, by the card device, the second biometric to a second biometric reference stored in said memory of the card device; (e) compiling a response to the authentication request including a first indicator associated with the comparison of the first biometric to the first biometric reference and a second indicator associated with the comparison of the second captured biometric to the second biometric reference; (f) transmitting, by the card device via the wireless network interface, the response to the authentication request to the communication device, thereby permitting the communication device to provide the response to the identification provider and permitting the identification provider to then provision a digital identity for the user to the communication device when the first and second indicators associated with the comparisons indicate matches between the first and second biometrics and the respective biometric references stored in said memory of the card device; (g) verifying, by the card device, a signature of the identification provider associated with the authentication request, prior to capturing the second biometric; and (h) storing the first biometric in said memory of the card device as the first biometric reference when a first biometric reference is not already stored in said memory.

As will also be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) authenticating, by a communication device, a certificate provided from a card device, via a wireless connection with the card device; (b) receiving, at the communication device, an authentication request from an identification provider; (c) capturing, by an input device of the communication device, a first biometric associated with a user, the first biometric including at least an image of the user; (d) after authenticating the certificate provided from the card device, transmitting, by the communication device, the authentication request and the first biometric to the card device, via the wireless connection; (e) when the first biometric is not compared to a first reference biometric in the card device, capturing, by the communication device, an image associated with a physical document indicative of an identity of the user; (f) comparing, by the communication device, the first biometric to the captured image associated with the physical document; (g) transmitting an indicator, received from the card device and representative of a second biometric comparison by the card device, to the identification provider when the first biometric and the captured image associated with the physical document match, thereby permitting the identification provider to provision a digital identity to the communication device when the comparison of the first biometric and the captured image associated with the physical document indicate a match and the indicator from the card device associated with the second biometric comparison indicates a match between a second biometric captured at the card device and a second reference biometric stored at the card device; (h) generating a key pair including a public key and a private key; (i) transmitting the public key and a device ID for the communication device to the identification provider, prior to receiving the authentication request from the identification provider; (j) polling for the card device for a defined interval after transmitting the public key to the identification provider; (k) receiving a signed, encrypted response from the card device, in response to the authentication request, when the first reference biometric for the first biometric is included in the card device and the response includes an indicator of a match for the comparison between the first reference biometric and the first biometric; (l) passing the signed, encrypted response from the card device to the identification provider; and (m) further comprising informing the card device of a match for the comparison between the first biometric and the captured image associated with the physical document, thereby permitting the card device to store the first biometric as the first reference biometric for one or more subsequent authentication requests.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in provisioning a digital identity for a user from an identification provider to a communication device, the method comprising:
   authenticating, by a communication device, a certificate provided from a card device, via a wireless connection with the card device;
   receiving, at the communication device, an authentication request from an identification provider;
   capturing, by an input device of the communication device, a first biometric associated with a user, the first biometric including at least an image of the user;
   after authenticating the certificate provided from the card device, transmitting, by the communication device, the authentication request and the first biometric to the card device, via the wireless connection;
   in response to the first biometric not being compared to a first reference biometric in the card device, capturing, by the communication device, an image associated with a physical document indicative of an identity of the user;
   comparing, by the communication device, the first biometric to the captured image associated with the physical document; and
   transmitting an indicator, received from the card device and representative of a second biometric comparison by the card device, to the identification provider in response to the first biometric and the captured image associated with the physical document matching, thereby permitting the identification provider to provision a digital identity to the communication device when the comparison of the first biometric and the captured image associated with the physical document indicate a match and the indicator from the card device associated with the second biometric comparison indicates a match between a second biometric captured at the card device and a second reference biometric stored at the card device.

2. The computer-implemented method of claim 1, further comprising generating a key pair including a public key and a private key; and
   transmitting the public key and a device ID for the communication device to the identification provider, prior to receiving the authentication request from the identification provider.

3. The computer-implemented method of claim 2, further comprising polling for the card device for a defined interval after transmitting the public key to the identification provider.

4. The computer-implemented method of claim 1, wherein capturing the first biometric includes capturing an image of a face of the user; and
   further comprising capturing the second biometric by the card device, the second biometric including a fingerprint of the user.

5. The computer-implemented method of claim 1, further comprising receiving a signed, encrypted response from the card device, in response to the authentication request, when the first reference biometric for the first biometric is included in the card device and the response includes an indicator of a match for the comparison between the first reference biometric and the first biometric.

6. The computer-implemented method of claim 5, further comprising passing the signed, encrypted response from the card device to the identification provider.

7. The computer-implemented method of claim 1, further comprising informing the card device of a match for the comparison between the first biometric and the captured image associated with the physical document, thereby permitting the card device to store the first biometric as the first reference biometric for one or more subsequent authentication requests.

8. The computer-implemented method of claim 1, wherein the card device is a payment card device associated with a payment account issued to the user by an issuer, whereby the payment card device is capable of initiating a payment account transaction funded via the payment account.

9. A system for use in provisioning a digital identity for a user from an identification provider to a communication device, the system comprising:
- a communication device configured to:
  - authenticate a certificate provided from a card device, via a wireless connection with the card device;
  - receive an authentication request from an identification provider;
  - capture a first biometric associated with a user, the first biometric including at least an image of the user;
  - after authenticating the certificate provided from the card device, transmit the authentication request and the first biometric to the card device, via the wireless connection;
  - in response to the first biometric not being compared to a first reference biometric in the card device, capture an image associated with a physical document indicative of an identity of the user;
  - compare the first biometric to the captured image associated with the physical document; and
  - transmit an indicator, received from the card device and representative of a second biometric comparison by the card device, to the identification provider in response to the first biometric and the captured image associated with the physical document matching, thereby permitting the identification provider to provision a digital identity to the communication device when the comparison of the first biometric and the captured image associated with the physical document indicate a match and the indicator from the card device associated with the second biometric comparison indicates a match between a second biometric captured at the card device and a second reference biometric stored at the card device.

10. The system of claim 9, wherein the communication device is further configured to:
- generate a key pair including a public key and a private key; and
- transmit the public key and a device ID for the communication device to the identification provider, prior to receiving the authentication request from the identification provider.

11. The system of claim 10, wherein the communication device is further configured to poll for the card device for a defined interval after transmitting the public key to the identification provider.

12. The system of claim 9, wherein the first biometric is an image of a face of the user; and
- wherein the communication device is further configured to capture the second biometric by the card device, the second biometric including a fingerprint of the user.

13. The system of claim 9, wherein the communication device is further configured to receive a signed, encrypted response from the card device, in response to the authentication request, when the first reference biometric for the first biometric is included in the card device and the response includes an indicator of a match for the comparison between the first reference biometric and the first biometric.

14. The system of claim 13, wherein the communication device is further configured to pass the signed, encrypted response from the card device to the identification provider.

15. The system of claim 9, wherein the communication device is further configured to inform the card device of a match for the comparison between the first biometric and the captured image associated with the physical document, thereby permitting the card device to store the first biometric as the first reference biometric for one or more subsequent authentication requests.

16. The system of claim 9, wherein the card device is a payment card device associated with a payment account issued to the user by an issuer, whereby the payment card device is capable of initiating a payment account transaction funded via the payment account.

* * * * *